Aug. 3, 1937.         S. H. HOBSON         2,088,652
GAS BURNER AND UTENSIL SUPPORT THEREFOR
Filed June 7, 1934          2 Sheets-Sheet 2
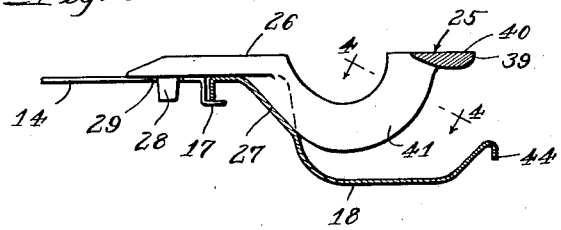
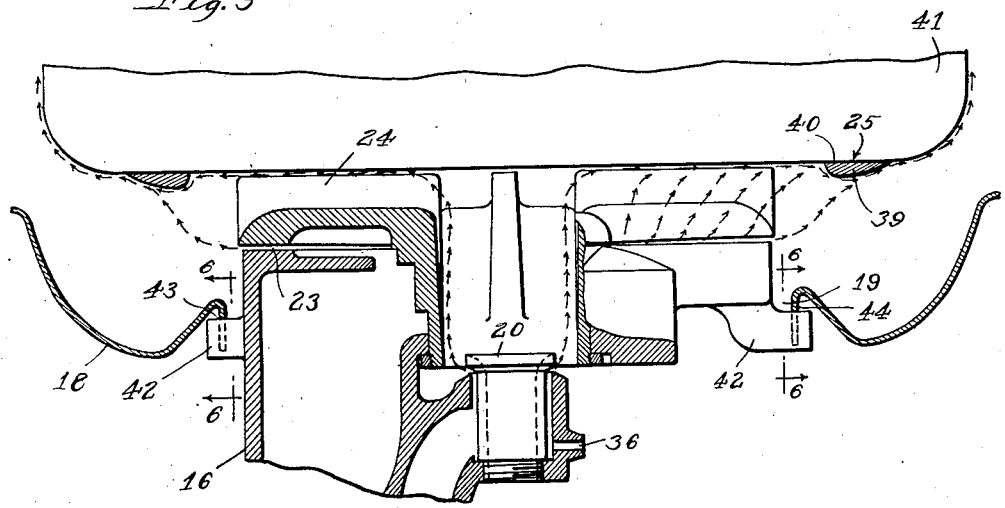
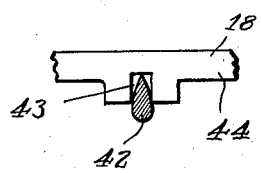
Inventor:
Stanley H. Hobson
By
Wilson, Lovell, McCanna & Wintercorn
Attys.

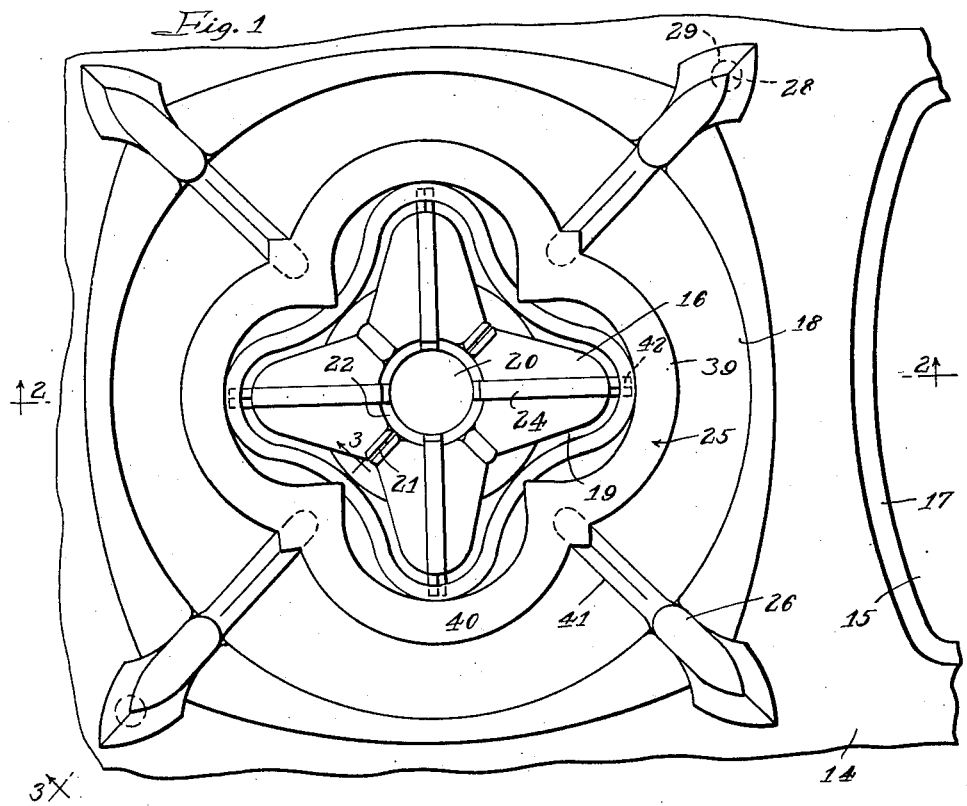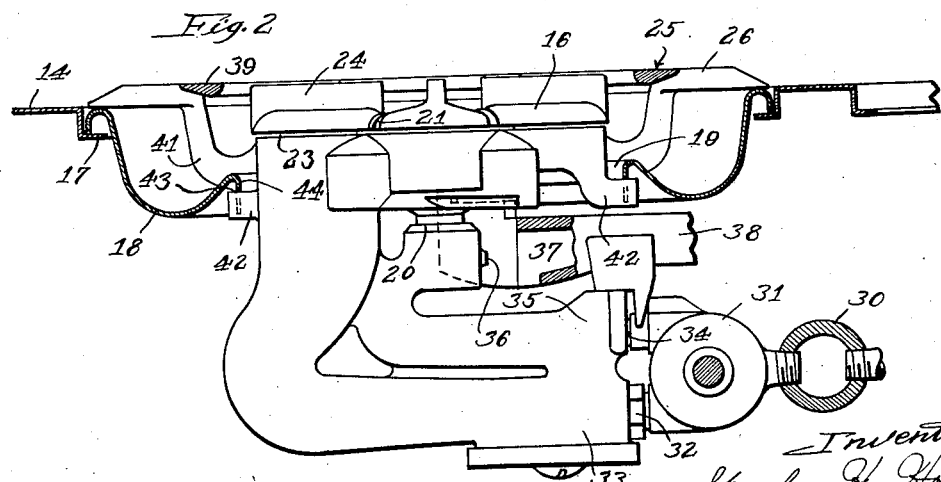

Patented Aug. 3, 1937

2,088,652

UNITED STATES PATENT OFFICE 2,088,652

GAS BURNER AND UTENSIL SUPPORT THEREFOR

Stanley H. Hobson, Rockford, Ill., assignor, by mesne assignments, to Reconstruction Finance Corporation, Chicago, Ill., a corporation of the United States Application June 7, 1934, Serial No. 729,409

6 Claims. (Cl. 126—214)

This invention relates to gas ranges and has particular reference to a gas burner and utensil support therefor.

The efficiency of burners, I have found, is greatly impaired where little or no consideration is given the matter of good design and construction of the support for the utensil. In most cases, experiment has shown that the products of combustion are not given a good opportunity of sweeping or scrubbing the bottom and sides of the utensil to transfer heat. I have found that most grids by reason of the form or arrangement of the various parts thereof actually have a baffling action and deflect the products of combustion away from the walls of the receptacle. It is therefore the principal object of my invention to provide a utensil support, the various utensil engaging portions of which are specially formed in vertical cross-section to half streamline section, on substantially horizontal axes, with a view to providing flat top utensil supporting surfaces and streamlined bottom surfaces with respect to which the products of combustion will travel with minimum deflection from the walls of the utensil, whereby to secure maximum heat transfer.

Another object consists in completely streamlining on radial axes with respect to the burner such other portions of the utensil support as might otherwise constitute a serious obstruction to the passage of the flame and products of combustion from the burner to the utensil, whereby to further insure more efficient heating. Where the burner has a bowl surrounding it and spaced therefrom, and lugs on the burner interlocked with the bowl to insure good registration and a uniform space around the burner for the passage of secondary air to support combustion, the lugs are likewise preferably of streamline cross-section on vertical axes to minimize obstruction to upward air flow relative thereto and, consequently, insure good combustion at all points on the burner.

The invention is illustrated in the accompanying drawings, in which—

Figure 1 is a plan view of a portion of the cooking top of a gas range, showing a burner and cooperating bowl and utensil support made in accordance with my invention;

Fig. 2 is a view of the burner assembly partly in vertical section on the line 2—2 of Figure 1;

Fig. 3 is a vertical sectional detail of the bowl and utensil support on the line 3—3 of Figure 1;

Fig. 4 is a section on the line 4—4 of Fig. 3;

Fig. 5 is an enlarged section of the burner assembly in the plane of the line 2—2 of Figure 1, but showing one finger of the burner in side elevation in order better to illustrate by the dotted lines the directions taken by the flame and products in the operation of the burner, and Fig. 6 is a sectional detail on either line 6—6 of Fig. 5.

The same reference numerals are applied to corresponding parts throughout the views.

The burner assembly herein disclosed is shown in a general way in my co-pending application Serial No. 721,101, filed April 18, 1934, and reference may be had to that application for a disclosure of other related parts of the range. The burner forms the subject matter of another application Serial No. 740,040, filed August 16, 1934. The numeral 14 designates the cooking top which is of sheet metal and has openings 15 therein for the burners 16. Depressed ledges 17 bound the openings 15 and support sheet metal bowls 18 in which openings 19 of four leaf clover or star shape to conform to the burners 16, are provided for the projection therethrough of the burners (see Fig. 5). Secondary air to support combustion flows upwardly through these openings around the burners. The burners 16 are all double burners, that is, each has a small simmer burner 20 at the center thereof which incidentally also serves as a lighter for the main burner, the lighting being accomplished by the propagation of flame through radial slots 21 in the top of the main burner 16 extending from the annular space 22 around the simmer burner to the continuous peripheral slot 23 defined between the top and the body of the main burner. Both sections of each burner burn with a sheet flame, the flame of the simmer section being circular and that of the main section star shaped. Secondary air also flows upwardly through the annular space 22 between the burner sections to support combustion at the simmer burner. The upstanding radial ribs 24 on the top of each burner reach to a plane above the cooking top 14, and utensil supports 25 conformed to the outline of the burners as shown in Figure 1 have the tops thereof slightly above or level with the burners for proper support of the utensils, as indicated in Fig. 5, and are supported on the cooking top by four arms 26 radiating from the supports and fitting in depressions 27 in the marginal portions of the bowls 18 for proper registration of the parts. Downward projections 28 on the outer ends of two arms of each utensil support enter holes 29 provided therefor in the cooking top to further assure proper registration of the bowl and support with the burner and to prevent slippage of the support out of position when a utensil is slid across the top thereof. The type of stove in which the present invention is shown embodied may be called a semi-closed top stove, because, while the cooking top 14 is closed, the bowl 18 and utensil support 25 cooperating with each burner 16 and its sub-burner 20, form a heat concentrating unit for efficiently heating a utensil placed over the burner, while allowing final escape of the products of combustion to the atmosphere, instead of having the products conducted under the cooking top to a discharge flue, as in an ordinary closed top stove. It should, however, be understood that the present invention in its broader aspects is not limited to application to this type of stove but might be applied to a gas range having an open or closed top.

A gas supply manifold, indicated at 30 in Fig. 2, has a rotary disc type valve 31 communicating therewith and provided with a main jet 32 discharging into the mixer 33 of the main burner 16, and a secondary jet 34 discharging into the mixer 35 of the sub-burner 20. The valve 31, as described in the other application referred to, is constructed so that when its disc is turned part way from "off" position, gas is delivered only to the sub-burner 20 through jet 34. When that occurs, gas is discharged through jet 36 from the side of the sub-burner into the flash-back passage 37 of the lighter 38 and is conducted to a constantly burning pilot light at the center of the lighter, whereupon a flash-back occurs and results in the ignition of the sub-burner 20 and its lateral jet 36. The disc of the valve 31 may be turned further to supply gas to the main burner 16 through jet 32, the size of the flame being regulated by the adjustment of the disc. The main burner is ignited from the sub-burner through the slots 21. As previously stated, both sections of the burner burn with a sheet flame, the flame of the sub-burner 20 being circular and that of the main burner star or clover shaped. The burner is removably supported on the lighter 38, as fully described in the other applications.

In accordance with the present invention, as best appears in Figs. 3 to 5, the utensil support 25 has the star or clover shaped center ring 39 thereof formed to streamline cross-section, more specifically, a half streamline cross-section, there being only the lower half, with a flat top surface 40 whereon the utensil, such as that indicated at 41 in Fig. 5, is adapted to rest. The major axis of this substantially streamline cross-section is horizontal and hence substantially parallel with the direction of gas flow relative thereto. It will also be noticed in Fig. 5 that the blunt edge of the section is innermost and the sharp edge outermost, in keeping with the principles of aerodynamics as applied to the present structure in which the direction of gas flow is, generally speaking, outwardly from the center of the ring 39. As a result of this special forming of the ring, there is minimum obstruction to gas flow and minimum deflection of gas flow away from the utensil. Thus, the products within the ring rising from the burner to the bottom of the utensil, as indicated by the arrows in Fig. 5, will flow outwardly along the bottom of the utensil, and, upon encountering the ring, will not be deflected perceptibly but sweep under the ring and right back again along the bottom of the utensil and up the sides, transferring heat by this "scrubbing" action all of the way, excepting only at the points where the ring of the support engages the utensil, at which points there is, of course, still the indirect heating through the ring itself. In other words, the present invention, by streamlining the utensil engaging portions of the support, avoids the conditions of obstruction to gas flow and deflection of gas flow away from the utensil; there are no shielded areas on the utensil downstream from the utensil engaging portions, as in previous constructions. The horizontally flattened form of the ring also is of advantage in avoiding obstruction to the flow of products from the outer ends of the fingers of the burner, as is indicated by the outermost arrows in Fig. 5, which show how these products rise from the burner and come into immediate contact with the bottom of the utensil outside the ring and flow up the sides of the utensil with the rest of the products; there is no deflection of these products away from the utensil as in other constructions. It follows that since the products from the main burner 16 and sub-burner 20 are given every opportunity of scrubbing the walls of the receptacle, as appears in Fig. 5, the heat transfer to the utensil is made most efficient and a saving in gas consumption is realized.

The downwardly bent elbow portions 41 of the arms 26 are, in accordance with my invention, also formed to a streamline cross-section, as clearly appears in Fig. 4. In that way, there are no shielded areas on the utensil upstream from the arms 26; the products flowing outwardly under the ring 39 pass around the sides of the elbow portions 41 and merge again immediately beyond and flow up the sides of the utensil, transferring heat all the way by the scrubbing action.

Outwardly projecting lugs 42 are provided on the burner 16 on the outer ends of the four fingers thereof for reception in slots 43 provided therefor in the downwardly bent flange 44 on the inner circumference of the bowl 18. These lugs serve to locate the bowl and burner in proper register so that the space 19 for the passage of secondary air between the bowl and burner will be uniform all around the burner. Obviously, that is important inasmuch as proper combustion depends upon the adequate supply of secondary air. The lugs 42, in keeping with the present invention, are also of streamline cross-section, as clearly appears in Fig. 6, with the major axis vertical and in line with the direction of air flow relative thereto. Since the air flow is upwardly, the lower edge is blunt and the upper edge sharp. This results in minimum obstruction to the flow of secondary air so that those portions of the burner directly over the lugs are assured of adequate supply of secondary air.

It is believed the foregoing description conveys a good understanding of the objects and advantages of my invention. The appended claims have been drawn with a view to covering all legitimate modifications and adaptations.

I claim:

1. In combination, a fuel burner, and a utensil support therefor having those portions adapted to engage the bottom of a utensil formed substantially to a half streamline cross-section, the major axis of such section being substantially horizontal so as to be in the direction of normal flow of products of combustion relative to the bottom of a utensil when resting on the support, the top of such section being flat for flush engagement with the flat bottom of a utensil and the bottom thereof being streamlined, with the blunt edge innermost and the sharp edge outermost with respect to the center of the burner.

2. In a gas stove having a cooking top provided with an opening, a burner in said opening, means surrounding the burner in said opening confining the products of combustion therefrom to discharge upwardly through said opening, and a utensil support comprising an open frame portion disposed substantially horizontally over the burner to support a utensil in the heat zone, the frame portion having a half streamline cross-section at all points circumferentially thereof whereby to provide a flat top surface to support a utensil thereon, said frame section being disposed with the major axis of such section substantially horizontal and the blunt side innermost with respect to the center of the burner.

3. In a gas stove having a cooking top provided with an opening, a certain shaped burner in said opening, a bowl removably disposed in the opening and having an opening provided therein similar in shape to the burner through which the burner projects with clearance about the burner for the passage of secondary air upwardly around the burner, radial projections on the burner engaging from beneath the bowl in recesses provided therefor in the bowl to secure registration between the burner and bowl so that the burner is centrally disposed in the opening in the bowl with substantially uniform clearance thereabout for passage of secondary air relative thereto, said projections being formed with a substantially streamline cross-section, with the major axis of such section substantially vertical and in the direction of secondary air flow relative thereto and with the blunt side lowermost, and a utensil support over the burner and bowl, said utensil support comprising a central portion having an opening provided therein shaped to correspond with the shape of the burner and adapted to register therewith and supporting arms extending outwardly therefrom to rest on the cooking top, said support having one or more of said arms arranged to enter, from above the bowl recesses provided therefor in the bowl to insure registration of the support with the burner, said arms being formed to a substantially streamline cross-section with the major axis of such section in a plane substantially at right angles to the horizontal plane of the central portion of said support and on a radius from the center of the burner, with the blunt side innermost relative to the center of the burner.

4. In a gas stove having a cooking top provided with an opening, a utensil support comprising a central open frame portion adapted to register with a burner, and arms extending from the frame portion serving by engagement with the cooking top to support the utensil support thereon, downward projections on said arms received in openings provided therefor in the cooking top to position said utensil support, a bowl fitting freely in the opening in the cooking top and having recesses provided therein receiving the outer portions of the aforesaid arms to position the bowl with respect to the support, said bowl having an opening provided therein registering with the opening in the frame portion of the utensil support and adapted to receive a burner, and a burner disposed in the last mentioned opening.

5. In a gas stove having a cooking top provided with an opening, a utensil support comprising a central open frame portion adapted to register with a burner, and arms extending from the frame portion serving by engagement with the cooking top to support the utensil support thereon, downward projections on said arms received in openings provided therefor in the cooking top to position said utensil support, a bowl fitting freely in the opening in the cooking top and having recesses provided therein receiving the outer portions of the aforesaid arms to position the bowl with respect to the support, said bowl having an opening provided therein registering with the opening in the frame portion of the utensil support and adapted to receive a burner, and a burner disposed in the last mentioned opening and having projections thereon received in recesses provided therefor in the bowl to position the burner relative to the bowl, centrally in the opening in the latter and with uniform clearance around the burner for the passage of secondary air upwardly around the burner and into the bowl, the aforesaid arms and said last mentioned projections being formed to a substantially streamline cross-section, the major axis of the section of the arms being substantially on a radius from the center of the burner and the major axis of the section of said projections being substantially vertical.

6. In a gas stove having a cooking top provided with an opening, a utensil support comprising a central open frame portion adapted to register with a burner, and arms extending from the frame portion serving by engagement with the cooking top to support the utensil support thereon, a bowl fitting freely in the opening in the cooking top and having recesses provided therein receiving the outer portions of the aforesaid arms to position the bowl with respect to the support, one of the bowl and support elements having means for positioning the same relative to the cooking top, said bowl having an opening provided therein registering with the opening in the frame portion of the utensil support and adapted to receive a burner, and a burner disposed in the last mentioned opening.

STANLEY H. HOBSON.